US009193436B2

(12) United States Patent
Bernhardt

(10) Patent No.: US 9,193,436 B2
(45) Date of Patent: Nov. 24, 2015

(54) FLOW CONTROL STRUCTURE AND ASSOCIATED METHOD FOR CONTROLLING ATTACHMENT WITH A CONTROL SURFACE

(71) Applicant: The Boeing Company, Chicago, IL (US)

(72) Inventor: Roger D. Bernhardt, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 63 days.

(21) Appl. No.: 13/934,934

(22) Filed: Jul. 3, 2013

(65) Prior Publication Data

US 2015/0008292 A1    Jan. 8, 2015

(51) Int. Cl.
*B64C 9/00*      (2006.01)
*B64C 21/04*     (2006.01)
*B64C 21/08*     (2006.01)

(52) U.S. Cl.
CPC . *B64C 9/00* (2013.01); *B64C 21/04* (2013.01); *B64C 21/08* (2013.01)

(58) Field of Classification Search
USPC .......................................... 244/213; 416/1, 23
See application file for complete search history.

(56) References Cited

U.S. PATENT DOCUMENTS

| 3,055,614 | A | | 9/1962 | Thompson |
| 4,392,621 | A | * | 7/1983 | Viets ............................ 244/12.5 |
| 4,426,054 | A | * | 1/1984 | Wang ............................ 244/212 |
| 4,447,028 | A | * | 5/1984 | Wang ............................ 244/212 |
| 4,865,267 | A | * | 9/1989 | Severson ..................... 244/53 B |
| 4,917,332 | A | | 4/1990 | Patterson, Jr. |
| 5,150,859 | A | | 9/1992 | Ransick |
| 5,772,155 | A | * | 6/1998 | Nowak ........................ 244/200.1 |
| 6,345,792 | B2 | * | 2/2002 | Bilanin et al. ................ 244/215 |
| 6,371,414 | B1 | * | 4/2002 | Truax et al. ................... 244/201 |
| 6,679,048 | B1 | * | 1/2004 | Lee et al. ......................... 60/204 |
| 6,682,021 | B1 | * | 1/2004 | Truax et al. ................... 244/201 |
| 7,222,819 | B1 | * | 5/2007 | Kelnhofer ................... 244/53 B |

(Continued)

FOREIGN PATENT DOCUMENTS

FR    2 160 854 A1    7/1973
GB    718 498 A       11/1954

(Continued)

OTHER PUBLICATIONS

European Search Report for Application No. EP 14 17 5643 dated Nov. 5, 2014.

*Primary Examiner* — Timothy Collins
*Assistant Examiner* — Medhat Badawi
(74) *Attorney, Agent, or Firm* — Alston & Bird LLP

(57) ABSTRACT

A wing assembly, a wing applique and an associated method for controlling the flow of air over a wing are provided. A wing assembly may include a wing having leading and trailing edges. The wing assembly also includes a flow control structure, such as an applique, carried by the surface of the wing so as to extend from a first end to a second end. The flow control structure defines an inlet proximate to the first end, an outlet proximate to the second end and the internal passage extending from the inlet to the outlet. The wing assembly may also include a control surface, such as a wedge, positioned downstream of the outlet. The flow control structure is configured to control the flow of air exiting from the outlet in order to correspondingly control attachment of the air with the control surface.

19 Claims, 2 Drawing Sheets

(56) References Cited

U.S. PATENT DOCUMENTS

| | | | |
|---|---|---|---|
| 7,270,214 B1 | 9/2007 | Tonnessen et al. | |
| 7,410,133 B2* | 8/2008 | Lee et al. | 244/215 |
| 7,665,694 B2* | 2/2010 | Hein et al. | 244/129.5 |
| 7,728,265 B1* | 6/2010 | Deeds et al. | 244/3.21 |
| 7,784,732 B2* | 8/2010 | Owens et al. | 244/53 B |
| 7,823,840 B2* | 11/2010 | Shmilovich et al. | 244/215 |
| 8,087,618 B1* | 1/2012 | Shmilovich et al. | 244/215 |
| 8,240,616 B2* | 8/2012 | Miller et al. | 244/204 |
| 8,353,482 B2* | 1/2013 | Miller et al. | 244/204 |
| 8,678,310 B2* | 3/2014 | Masoudipour et al. | 244/58 |
| 2006/0061222 A1* | 3/2006 | McAuliffe et al. | 310/60 R |
| 2006/0073030 A1* | 4/2006 | McAuliffe et al. | 417/366 |
| 2007/0120009 A1* | 5/2007 | Kelnhofer | 244/53 R |
| 2008/0142640 A9* | 6/2008 | Lejeau et al. | 244/213 |
| 2009/0194633 A1* | 8/2009 | De Souza et al. | 244/54 |
| 2013/0248657 A1* | 9/2013 | Riordan | 244/53 B |
| 2013/0306788 A1* | 11/2013 | Criado | 244/36 |

FOREIGN PATENT DOCUMENTS

| | | |
|---|---|---|
| WO | WO 2009/004499 A1 | 1/2009 |
| WO | WO 2011/110327 A2 | 9/2011 |

* cited by examiner

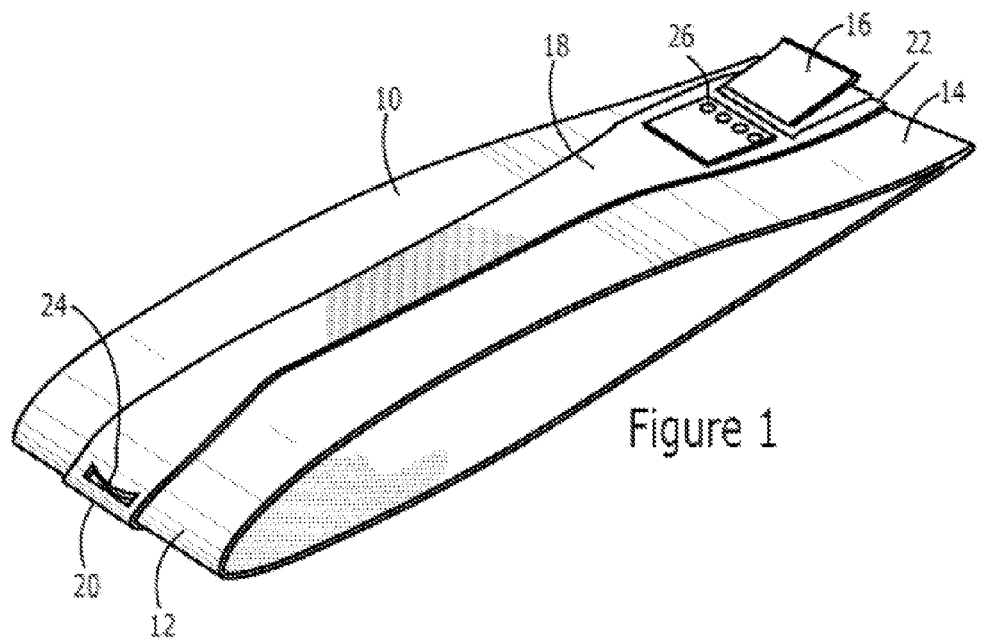
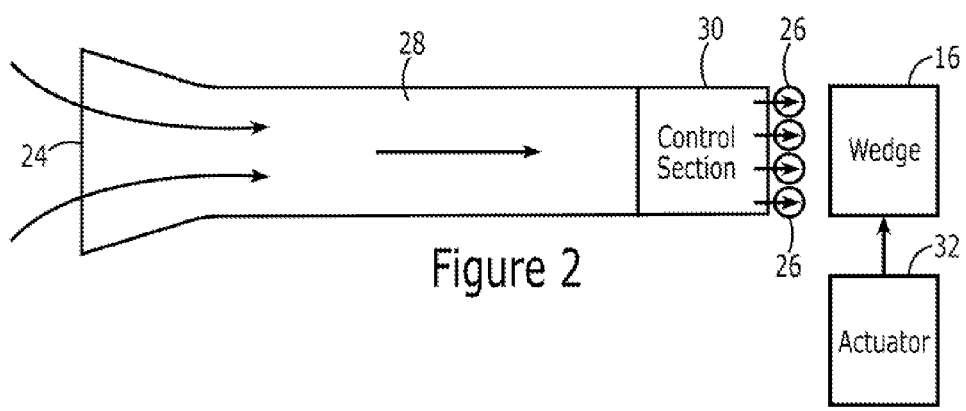
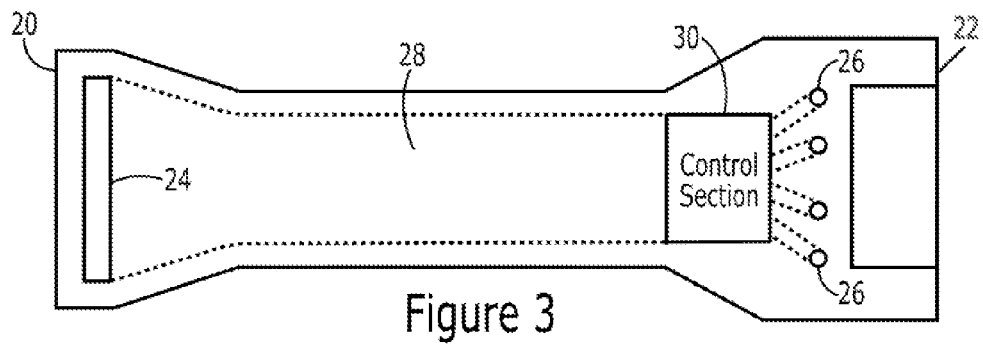

US 9,193,436 B2

FLOW CONTROL STRUCTURE AND ASSOCIATED METHOD FOR CONTROLLING ATTACHMENT WITH A CONTROL SURFACE

TECHNOLOGICAL FIELD

An example embodiment of the present disclosure relates generally to the control of air flow over a wing and, more particularly, to a wing applique and an associated method for controlling the flow of air over a wing.

BACKGROUND

Fixed wing aircraft and rotorcraft include wings that provide lift and facilitate controlled flight of the air vehicle. For example, a fixed wing aircraft generally includes two or more wings that extend laterally outward from the fuselage. As another example, a rotorcraft includes a plurality of blades, each of which constitutes a wing.

By controlling the flow of air over a surface of a wing, such as the upper surface of a wing, the aerodynamic performance of the air vehicle may be at least partially controlled. By way of example, some wings include a wedge, such as a fixed wedge or movable flap attached, such as by an adhesive, to a surface of the wing. For example, a wedge may be attached proximate the trailing edge of a wing. The wedge may alter the flow of air over the surface of the wing and, as such, may affect the aerodynamic performance of the air vehicle.

In some instances in which the wedge is embodied as a moveable flap, the flap may be controllably positioned so as to change the flow of air across the surface of the wing and, in turn, to alter the aerodynamic performance of the air vehicle. However, moving flaps very quickly in order to alter the aerodynamic performance of the air vehicle in the desired manner takes significant energy and adds control system weight to the air vehicle generally commensurate to the desired speed of actuation.

BRIEF SUMMARY

A wing assembly, a wing applique and an associated method for controlling the flow of air over a wing are provided in accordance with an example embodiment of the present disclosure. By controlling the flow of air over a wing, the aerodynamic performance of the air vehicle that includes the wing may be correspondingly controlled. In an example embodiment, the wing assembly may include a control surface such that a flow control structure carried by the wing may control the attachment of air with the control surface. As such, the impact of the control surface upon the aerodynamic performance of the air vehicle may be at least partially controlled in accordance with this example embodiment.

In one embodiment, a wing assembly is provided that includes a wing having a leading edge and a trailing edge. The wing assembly also includes a flow control structure carried by the surface of the wing so as to extend from a first end to a second end. The first end of the flow control structure is closer to the leading edge of the wing than the second end. Conversely, the second end of the flow control structure is closer to the trailing edge of the wing than the first end. The flow control structure defines an inlet proximate to the first end, an outlet proximate to the second end and the internal passage extending from the inlet to the outlet. The wing assembly of this embodiment also includes a control surface positioned downstream of the outlet of the flow control structure with the control surface of one embodiment being configured to be controllably repositioned. The flow control structure is configured to control the flow of air exiting from the outlet in order to correspondingly control attachment of the air with the control surface.

The flow control structure may include a control section configured to control the flow of air exiting from the outlet. The control section may be configured to modulate the air exiting from the outlet, such as by generating a plurality of pulses of air at a predefined frequency. The control section may alternatively be configured to control a direction of the air exiting from the outlet, such as by redirecting the air to have a contraflow in an upstream direction upon exiting from the outlet.

The flow control structure of an example embodiment may include an applique that includes the inlet, the outlet and the internal passage. The applique of this embodiment is attached to the surface of the wing. The wing assembly of one embodiment also includes a second applique attached to an opposite surface of the wing. The applique may have a thickness in the direction orthogonal to the surface of the wing and a width parallel to the surface of the wing with the width of the applique being greater than the thickness of the applique.

In another embodiment, a wing applique is provided that includes an applique body configured to be attached to the surface of a wing so as to extend from a first end to a second end. The first end of the applique body is closer to the leading edge of the wing than the second end. Conversely, the second end of the applique body is closer to the trailing edge of the wing than the first end. The applique body also defines an inlet proximate first end, an outlet proximate the second end and an internal passage extending from the inlet to the outlet. The applique of this embodiment includes a control section configured to control the flow of air exiting from the outlet in order to correspondingly control attachment of the air downstream of the wing applique.

The control section may be configured to modulate the air exiting from the outlet. For example, the control section may be configured to generate a plurality of pulses of air at a predefined frequency. Alternatively, the control section may be configured to redirect the air to have a contraflow in an upstream direction upon exiting from the outlet. The wing applique may also include an adhesive to attach the applique body to the surface of the wing. The applique body may have a thickness in a direction orthogonal to the surface of the wing and a width in the direction parallel to the surface of the wing with the width of the applique body of one embodiment being greater than the thickness of the applique body.

The further embodiment, a method is provided for controlling the flow of air over a wing that has a control surface positioned proximate to the trailing edge of the wing. The method of this embodiment includes receiving air through an inlet of a flow control structure that is carried by the surface of the wing. The method also includes directing the air through an internal passage defined by the flow control structure such that it flows from the inlet to an outlet positioned upstream of the control surface. The method further includes controlling the flow of air exiting from the outlet in order to correspondingly control attachment of the air with the control surface downstream from the flow control structure.

The method of one embodiment may control the flow by modulating the air exiting from the outlet, such as by generating a plurality of pulses of air at a predefined frequency. Alternatively, the method may control the flow by redirecting the air so as to have a contraflow in an upstream direction upon exiting from the outlet. The method of an example embodiment may also include attaching an applique that comprises the flow control structure including the inlet, the outlet and the internal passage to the surface of the wing.

BRIEF DESCRIPTION OF THE DRAWINGS

Figure 4:
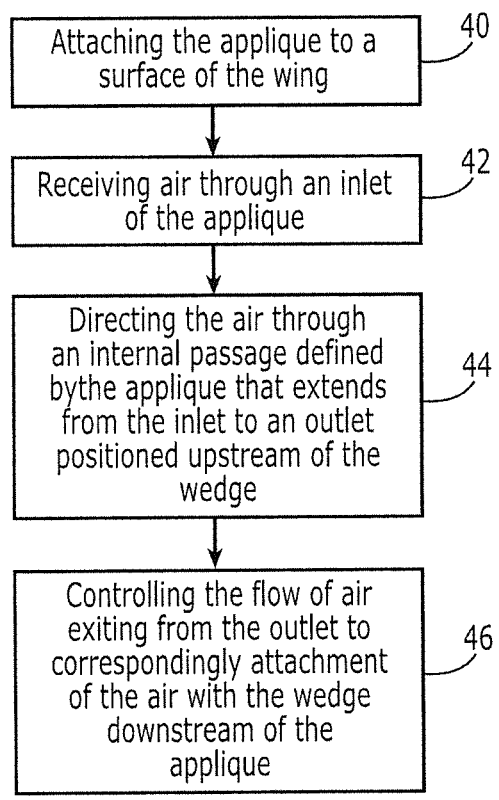
Figure 5:
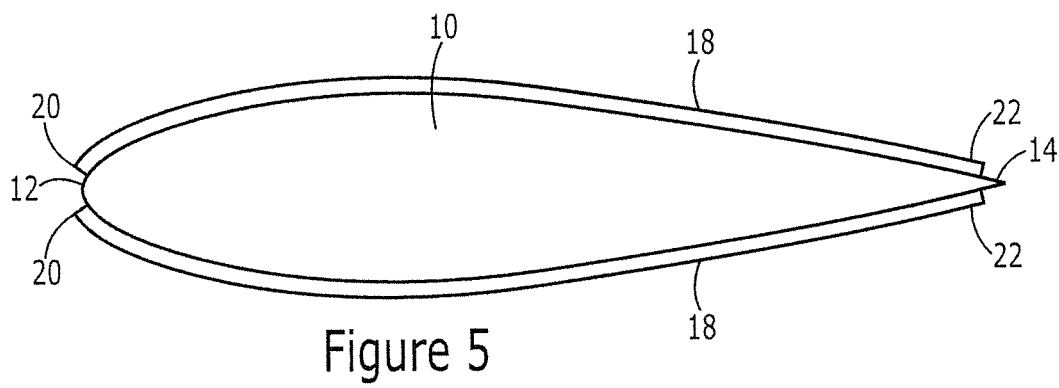

Having thus described certain example embodiments of the present disclosure in general terms, reference will hereinafter be made to the accompanying drawings, which are not necessarily drawn to scale, and wherein:

FIG. 1 is a prospective view of a wing assembly in accordance with an example embodiment of the present disclosure;

FIG. 2 is a block diagram of the applique and the wedge positioned downstream of the applique in accordance with an example embodiment of the present disclosure;

FIG. 3 is a top view of an applique in accordance with an example embodiment of the present disclosure;

FIG. 4 is a flowchart illustrating operations performed in accordance with a method of an example embodiment of the present disclosure; and FIG. 5 is a side view of a wing assembly that includes first and second appliques on both the upper and lower surfaces of the wing in accordance with an example of the present disclosure.

DETAILED DESCRIPTION

The aspects of the disclosure now will be described more fully hereinafter with reference to the accompanying drawings, in which some, but not all examples are shown. Indeed, this disclosure may be embodied in many different forms and should not be construed as limited to the examples set forth herein; rather, these examples are provided so that this disclosure will satisfy applicable legal requirements. Like numbers refer to like elements throughout.

Air vehicles may include a variety of different types of wings in order to generate lift and to facilitate controlled flight. For example, a fixed wing aircraft may include two or more wings that extend generally laterally outward from the fuselage. Additionally, rotorcraft include a plurality of blades, each of which may constitute a wing. One example of a section of a wing 10 is illustrated in FIG. 1. As shown, the wing may extend from a leading edge 12 to a trailing edge 14 relative to the typical flow of air over the wing in the downstream direction from the leading edge to the trailing edge. The wing also has an upper surface and a lower surface relative to the typical orientation of the air vehicle. With respect to the embodiment of FIG. 1, the upper surface of the wing faces upwardly and is visible and the lower surface faces downwardly and is hidden. The upper and lower surfaces of the wing may extend from the leading edge of the wing to the trailing edge.

Some wings 10 may include a control surface, such as a wedge 16 as shown, for example, in FIG. 1. Although a wing may include various types of control surfaces, a control surface embodied as a wedge will be described hereinafter by way of example, but not of limitation. The wedge may include a surface that extends outwardly from the surface of the wing upon which the wedge is mounted. As shown in the illustrated embodiment, the surface of the wedge that extends outwardly from the wing may be positioned at an angle relative to the surface of the wing upon which the wedge is mounted. The angled surface of the wedge therefore defines a gradual, such as a linear, deviation from the surface of the wing with the deviation increasing in the downstream direction.

The wedge 16 of one embodiment may be positioned proximate to the trailing edge 14 of the wing 10. In this regard, a wedge may be positioned proximate to the trailing edge of the wing in an instance in which the wedge is positioned adjacent to or at the trailing edge of a wing or in an instance in which the wedge is spaced from the trailing edge by a relatively small distance in comparison to the chord length of the wing that extends from the leading edge to the trailing edge, such as by no more than 20% and, in some embodiments, no more than 10% of the chord length. As such, air flowing over the surface of the wing will be redirected by the wedge and the resulting aerodynamic performance of the air vehicle may be correspondingly modified. Although a control surface may be integral to the wing, a control surface, such as the wedge of one embodiment, may be a distinct component that is attached to a surface of the wing, such as the upper surface of the wing. The control surface, such as the wedge, may be attached in various manners, such as by an adhesive.

The wedge 16 may be static so as to define a single, predefined angle relative to the surface of the wing 10 upon which the wedge is mounted. Alternatively, the wedge may include a flap that is controllably moveable so as to be differently positioned, thereby defining different angles with respect to the surface of the wing. As such, the flap may be controllably repositioned in order to alter the flow of air over the surface of the wing and, in turn, to alter the aerodynamic performance of the air vehicle. While a moveable flap may be configured in a variety of manners, the moveable flap of one embodiment may be formed of a bimetallic material, such as a nickel titanium, e.g., Nitinol, shape memory alloy. In instances in which the wedge includes a moveable flap, the wing assembly may also include an actuator 32 for controllably repositioning the flap, as shown in FIG. 2. However, the responsiveness and the rate with which the flap may be repositioned and, consequently, the frequency with which the flap may be repositioned may be less than is desired in some instances, such as in instances in which the blades of a rotorcraft include moveable flaps and the performance of the rotorcraft could be improved if the flaps could be repositioned between the advancement and the retraction of the blades during each rotation. Even in instances in which the flap is sufficiently responsive, the repositioning of the flap may consume significant energy and may require that control system weight be added to the air vehicle.

In addition to the wing 10, the wing assembly of an example embodiment also includes a flow control structure that is carried by the wing, such as proximate a surface of the wing. In one embodiment, the flow control structure may be embodied by an applique 18 that is attached to a surface of the wing. However, the flow control structure may be embodied in different manners, such as by being integral to the wing with the wing itself defining the inlet, outlet and inlet passage as described below. For purposes of illustration but not of limitation, the flow control structure will hereinafter be described as an applique.

While the applique 18 may be attached to either or both of the upper and lower surfaces of the wing, the wing assembly of the embodiment of FIG. 1 includes the applique attached to the upper surface of the wing. The applique includes an applique body that may be formed by various materials including, for example, a polymer, such as rubber. The applique may be attached to the surface of the wing in various manners. For example, the wing assembly may also include an adhesive, such as an epoxy, to attach the applique to the surface of the wing. As shown in FIG. 1, the applique body extends lengthwise from a first end 20 to a second end 22. The first end of the applique body is closer to the leading edge 12 of the wing than the second end. Conversely, the second end of the applique body is closer to the trailing edge 14 of the wing than the first end. In the illustrated embodiment, the first and second ends of the applique body may be positioned proximate to the leading and trailing edges, respectively, of the wing.

As shown, the applique 18 may have a relatively low profile. In this regard, the applique may have a thickness, such as an average thickness, as measured in a direction orthogonal to the surface of the wing 10 to which the applique is attached. Additionally, the applique may have a width, such as an average width, as measured in a direction parallel to the surface of the wing to which the applique is attached. In one embodiment, the thickness of the applique is greater than the width of the applique. For example, the thickness of the applique may be no more than a predefined percentage of the width, such as no more than 10% and, in one embodiment, no more than 5% of the width of the applique.

The applique body defines an inlet 24 proximate to first end 20. In this regard, the inlet may be located at or near the first end of the applique body, such as by being spaced from the first end of the applique body by no more than a predefined percentage of the length of the applique body, such as no more than 20% and, one embodiment, no more than 10% of the length of the applique body. The inlet is defined so as to be at least partially forwardly facing relative to the typical direction of travel of the aircraft such that air will be forced into the inlet during the flight of the air vehicle. As shown in FIG. 1, the inlet of the illustrated embodiment is positioned near the leading edge 12 of the wing 10 so as to be located upon a portion of the wing that is also at least partially forwardly facing.

The applique body also defines an outlet 26 proximate the second end 22. In this regard, the outlet may be located at or near the second end of the applique body, such as by being spaced from the second end of the applique body by no more than a predefined percentage of the length of the applique body, such as by no more than 20% or, in one embodiment, no more than 10% of the length of the applique body. The applique body also defines a passage 28 extending from the inlet to the outlet. Although the inlet 24 and the passage and, in some instances, the outlet, may have the same cross-sectional dimensions, the passage of the embodiment illustrated in FIGS. 2 and 3 has a smaller cross-sectional size than the inlet. In this regard, the inlet may be tapered inwardly in the downstream direction so as to transition from a relatively large opening proximate the first end 20 of the applique body to a smaller cross-sectional size that matches the cross-sectional dimensions of the passage. Additionally, the outlet may be a single opening or a plurality of openings, such as shown in FIGS. 1-3.

The inlet 24, the passage 28 and/or the outlet 26 may be fully defined by the applique body so as to extend through an internal portion of the applique body. Alternatively, the inlet, the passage and/or the outlet may be partially defined by the applique body and partially defined by the surface of the wing 10 to which the applique body is attached. In this embodiment, the combination of the surface of the wing to which the applique body is attached and the applique body cooperate to fully define the inlet, passage and/or outlet once the applique body is attached to the wing.

As shown in block 40 of FIG. 4, the applique 18 may be attached to a surface of a wing 10, such as with an adhesive. Thereafter, during operation of the air vehicle, such as during flight, air otherwise flowing over the surface of the wing in a downstream direction may be received by the inlet 24 as shown in block 42 and may be directed through the passage 28 as shown in block 44 prior to exiting from the applique through the outlet 26. As shown in FIGS. 2 and 3, the applique body may also include a control section 30 configured to control the flow of air exiting from the outlet, as shown in block 46 of FIG. 4. The control section may be internal to the applique body and is positioned upstream of the output, such as between the passage and the outlet.

The control section 30 may be configured to control the flow of air in various manners. In one embodiment, the control section may be configured to modulate the air exiting from the outlet 26, such as by generating a plurality of pulses of air at a predefined frequency, such as 250 hertz. By generating a plurality of pulses of air that exit from the outlet, the attachment of the air downstream of the outlet, such as the attachment of the air with the wedge 16 positioned downstream of the outlet, may be enhanced. In this embodiment, the control section may include one or more valves for receiving the air that flows through the passage and for controlling the release of the air through the outlet in a modulated manner. The one or more valves of the control section of this embodiment may be embodied in various manners, but may be embodied by one or more micro electro-mechanical systems (MEMS) valves.

Additionally, or alternatively, the control section 30 may be configured to control the direction of the air exiting from the outlet 26. For example, the control section may be configured to control the direction of the air exiting from the outlet so as to control whether the air exits from the outlet in a downstream direction, an upstream direction or some combination thereof. For example, the control section may be configured to redirect the air to have a contraflow in an upstream direction upon the exiting from the outlet. In this regard, the control section may direct the air through one or more openings that comprise the outlet and that face in the upstream direction such that the air that exits through these openings, such as in the form of air jets, has a contraflow in the upstream direction. By controllably redirecting the air to have a contraflow upon exiting from the outlet, the air that exits from the outlet may be selectively detached from the surface of the wing 10 so as to diminish the aerodynamic effect of the wing and/or a wedge 16 carried by the wing. Thus, the contraflow of the air exiting from the outlet just upstream of the wedge via the disruptive jets of air may negatively impact the attachment of air flow over the wedge. In one embodiment, the outlet may include one or more openings that extend in the upstream direction and one or more openings that extend in the downstream direction. As such, the control section of this embodiment, such as one or more valves, diverters or other redirection elements, may selectively direct air through one or both of the opening(s) that extend in the upstream direction or the opening(s) that extend in the downstream direction so as to control the direction of the flow of the air upon exiting from the outlet and to correspondingly control the attachment of the air to the surface of the wing. In an instance in which the control section directs the air to exit from the outlet that is positioned just upstream of the wedge with the air flow in the downstream direction, the air may have a contributing flow that attaches to the wedge and contributes to the aerodynamic effect of the wedge. Or, the control section may direct the air to exit from another outlet that is positioned downstream of the wedge such that the air flow has little impact upon the aerodynamic performance of the wedge, regardless of the direction of air flow The control section 30 of one embodiment may be powered by energy scavenging techniques that obtain energy from the flow of air therethrough. For example, the control section may include a vibrating reed piezoelectric device to power the electronics and/or air flow control devices within the flow control structure, such as the applique 18. Additionally or alternatively, the control section may be powered by pressurized air and/or electric power from the air vehicle.

In the embodiment in which the wing assembly includes a wedge 16, the wedge may be positioned downstream of the outlet 26 of the applique 18, such as immediately downstream of the outlet as shown in FIGS. 1-3. As such, the control of the flow of air exiting the outlet, such as the modulation of the air exiting from the outlet and/or the control of the direction of the air exiting from the outlet, provided by the control section 30 of the applique may correspondingly control the flow of air over the wedge and may consequently control the attachment of the air with the wedge. For example, the modulation of the air exiting from the outlet, such as the generation of a plurality of pulses of air at a predefined frequency, such as 250 hertz, may serve to enhance the attachment of the air that exits from the outlet with the wedge. Conversely, the redirection of the air that exits from the outlet so as to have a contraflow in an upstream direction may cause at least partial detachment of the flow of the air with the wedge. As such, the impact of the wedge upon the aerodynamic performance of the air vehicle may be selectively controlled by controlling the flow of the air that exits through the outlet of the applique.

The control section 30 may be configured to control the flow of air exiting from the outlet 26 in a very rapid and responsive manner. In this regard, the control section may be configured to quickly begin modulating the air exiting from the outlet and may similarly be configured to quickly halt modulation of the air exiting from the outlet. Similarly, the control section may be configured to quickly control the direction of the air that exits through the outlet, such as by quickly redirecting the air to have a contraflow and correspondingly quickly halting the redirection so as to permit the air to have a flow in the downstream direction upon exiting from the outlet. As such, a flow control structure, such as the wing applique 18, including the control section may quickly and responsively modify the aerodynamic effect of a wing 10 and/or a wedge 16 carried by a wing by controlling the flow of air through the outlet defined by the applique. Thus, the effect of a wedge upon the air flow over a wing and, in turn, upon the aerodynamic performance of the air vehicle may be quickly modified by controlling the flow of air that exits through the outlet with the control section of the applique, even in instances in which the wedge is either static or is comprised of a movable flap that cannot be physically repositioned as quickly as may be desired in some situations. By controlling the flow of air that exits the outlet with the control section, the control surface, such as the wedge, may be reduced in size and weight in some embodiments so as to correspondingly require less power to reposition.

With respect to a rotorcraft, for example, the control section 30 may be configured to control the flow of air that exits through the outlet 26 of the applique body in a different manner while the blade is advancing than while the blade is retracting and, in some instances, in still a different manner in instances in which the blade is traversing between advancing and retracting states. For example, the control section may be configured to direct the air exiting through the outlet in a downstream direction, such as by directing the air through one or more openings that extend in the downstream direction, and also to generate a plurality of pulses of air at a predefined frequency, such as 250 hertz, while a blade is advancing. As such, the attachment of the air with the wedge 16 may be enhanced and the aerodynamic effect provided by the wedge may be correspondingly enhanced while the blade is being advanced. Conversely, while a blade is retracting, the control section may be configured to redirect the flow of air such that the flow of air exiting through the outlet has a contraflow in an upstream direction. In this regard, the control section may redirect the air so as to exit through one or more openings that extend in the upstream direction. Moreover, the control section may be configured to halt modulation, e.g., pulsation, of the air while the air that exits the outlet has a contraflow in the upstream direction. As such, the flow of air may be at least partially detached from the wedge so as to diminish the effect of the wedge upon the aerodynamic performance of the rotorcraft while the blade is retracting. In one embodiment, the control section may rapidly switch between these two configurations while the blade is traversing between the advancing and retracting states, thereby improving the impact upon the aerodynamic performance of the rotorcraft provided by the wedge, even in an instance in which the wedge is either static or is comprised of a movable flap that cannot be physically repositioned with each rotation of the blades.

Although the wing assembly may include an applique 18 mounted upon one surface of the wing 10, the wing assembly of another embodiment may include a plurality of appliques mounted upon different surfaces of the wing. As shown in FIG. 5, for example, a wing assembly may include first and second appliques mounted upon the upper and lower surfaces, respectively, of a wing. Each applique may be configured in the same manner so as to similarly control the flow over the respective surface of the wing, thereby providing two independently controlled symmetric control surfaces above and below the wing. Alternatively, each applique may be configured in a different manner, such as by having control sections 30 configured to control the air exiting from the respective outlets 26 in different manners. Although the appliques may be discrete as shown in FIG. 5, the appliques may be different portions of the same applique body so as to extend continuously about the wing and over the different surfaces of the wing, thereby forming, for example, a band or ring that extends about the wing. Additionally, one or more appliques may be positioned along the length of a wing as measured from its point of attachment to its wing tip. For example, a plurality of appliques may be attached to the same surface, e.g., the upper surface, of a wing at different locations along the length of the wing, such as in instances in which a plurality of wedges 16 are similarly attached at different locations along the length of the wing such that the appliques may be positionally aligned with a corresponding wedge.

A wing assembly, a wing applique 18 and an associated method for controlling the flow of air over a wing are therefore provided in accordance with example embodiments of the present disclosure. By controlling the flow of air over a wing 10, the aerodynamic performance of the air vehicle that includes the wing may be correspondingly controlled. In an embodiment in which the wing assembly includes a wedge 16, the wing applique may control the attachment of air with the wedge. As such, the impact of the wedge upon the aerodynamic performance of the air vehicle may be at least partially controlled in accordance with this example embodiment.

Many modifications of the various aspects of the disclosure set forth herein will become apparent to one skilled in the art to which this disclosure pertains, having the benefit of the teachings presented in the foregoing description and the associated drawings. Therefore, it is to be understood that the disclosure is not to be limited to the specific examples presented herein and that modifications and other embodiments are intended to be included within the scope of the appended claims. Although specific terms are employed herein, they are used in a generic and descriptive sense only and not for purposes of limitation.

What is claimed is:

1. A wing assembly comprising:
a wing having a leading edge and a trailing edge;
a flow control structure carried by the wing so as to extend from a first end to a second end, wherein the first end is closer to the leading edge than the second end and the second end is closer to the trailing edge than the first end, wherein the flow control structure defines an inlet proximate the first end, an outlet comprising a plurality of openings proximate the second end and an internal passage extending from the inlet to the outlet, wherein the flow control structure comprises a control section configured to control a flow of air exiting from the outlet; and
a control surface positioned downstream of at least some openings of the outlet of the flow control structure, wherein the control surface is selected from the group consisting of a static control surface and a control surface that is configured to be repositioned by an actuator,
wherein the flow control structure is configured to control the flow of air exiting from the outlet in order to correspondingly control attachment of the air with the control surface,
wherein the flow control structure defines the outlet to include an opening extending in an upstream direction and an opening extending in a downstream direction,
wherein the control section is configured to control a direction of the air exiting from the outlet by controllably directing the air to one or more of the opening extending in an upstream direction or the opening extending in a downstream direction, and
wherein the control section comprises a piezoelectric device to provide power by energy scavenging techniques that obtain energy from the flow of air therethrough.

2. A wing assembly according to claim 1 wherein the control section is configured to modulate the air exiting from the outlet.

3. A wing assembly according to claim 2 wherein the control section is configured to modulate the air by generating a plurality of pulses of air at a predefined frequency.

4. A wing assembly according to claim 1 wherein the control section is configured to control the direction by redirecting the air to have a contraflow in an upstream direction upon exiting from the outlet.

5. A wing assembly according to claim 1 wherein the flow control structure comprises a polymeric applique including the inlet, the outlet and the internal passage, wherein the applique is attached to the surface of the wing.

6. A wing assembly according to claim 5 further comprising a second applique attached to an opposite surface of the wing.

7. A wing assembly according to claim 5 wherein the applique has a thickness in a direction orthogonal to the surface of the wing and a width in a direction parallel to the surface of the wing, wherein the width of the applique is greater than the thickness of the applique.

8. A wing applique comprising:
an applique body configured to be attached to a surface of a wing relative to a control surface so as to extend from a first end to a second end with the first end closer to a leading edge of the wing than the second end and the second end closer to a trailing edge of the wing than the first end, wherein the applique body defines an inlet proximate the first end, an outlet comprising a plurality of openings proximate the second end and an internal passage extending from the inlet to the outlet,
wherein the applique body comprises a control section configured to control a flow of air exiting from the outlet in order to correspondingly control attachment of the air downstream of the wing applique,
wherein the applique body defines the outlet to include an opening extending in an upstream direction and an opening extending in a downstream direction,
wherein the control section is configured to control a direction of the air exiting from the outlet by controllably directing the air to one or more of the opening extending in an upstream direction or the opening extending in a downstream direction, and
wherein the control section comprises a piezoelectric device to provide power by energy scavenging techniques that obtain energy from the flow of air therethrough.

9. A wing applique according to claim 8 wherein the control section is configured to modulate the air exiting from the outlet.

10. A wing applique according to claim 9 wherein the control section is configured to modulate the air by generating a plurality of pulses of air at a predefined frequency.

11. A wing applique according to claim 8 wherein the control section is configured to control the direction by redirecting the air to have a contraflow in an upstream direction upon exiting from the outlet.

12. A wing applique according to claim 8 wherein the applique body is comprised of a polymer, and wherein the wing applique further comprises an adhesive to attach the applique body to the surface of the wing.

13. A wing applique according to claim 8 wherein the applique body has a thickness in a direction orthogonal to the surface of the wing and a width in a direction parallel to the surface of the wing, wherein the width of the applique body is greater than the thickness of the applique body.

14. A method of controlling a flow of air over a wing having a control surface positioned proximate a trailing edge of the wing, the method comprising:
receiving air through an inlet of a flow control structure that includes a control section and is carried by a surface of the wing;
directing the air through an internal passage defined by the flow control structure that extends from the inlet to an outlet including a plurality of openings with at least some of the openings positioned upstream of the control surface;
controlling the flow of air exiting from the outlet in order to correspondingly control attachment of the air with the wedge downstream of the flow control structure,
wherein the flow control structure defines the outlet to include an opening extending in an upstream direction and an opening extending in a downstream direction, and
wherein controlling the flow of air exiting from the outlet comprises controlling a direction of the air exiting from the outlet by controllably directing the air to one or more of the opening extending in an upstream direction or the opening extending in a downstream direction, and
wherein the control section comprises a piezoelectric device to provide power by energy scavenging techniques that obtain energy from the flow of air therethrough.

15. A method according to claim 14 wherein controlling the flow comprises modulating the air exiting from the outlet.

16. A method according to claim 15 wherein modulating the air exiting from the outlet comprises generating a plurality of pulses of air at a predefined frequency.

17. A method according to claim 14 wherein controlling the flow comprises redirecting the air to have a contraflow in an upstream direction upon exiting from the outlet.

18. A method according to claim 14 wherein the flow control structure comprises a polymeric applique including the inlet, the outlet and the internal passage, and wherein the method further comprises attaching the applique to the surface of the wing.

19. A wing assembly according to claim 1 wherein the control section is configured to modify the flow of air exiting from the outlet more quickly than the control surface is configured to be repositioned by the actuator.

* * * * *